Figure 1:
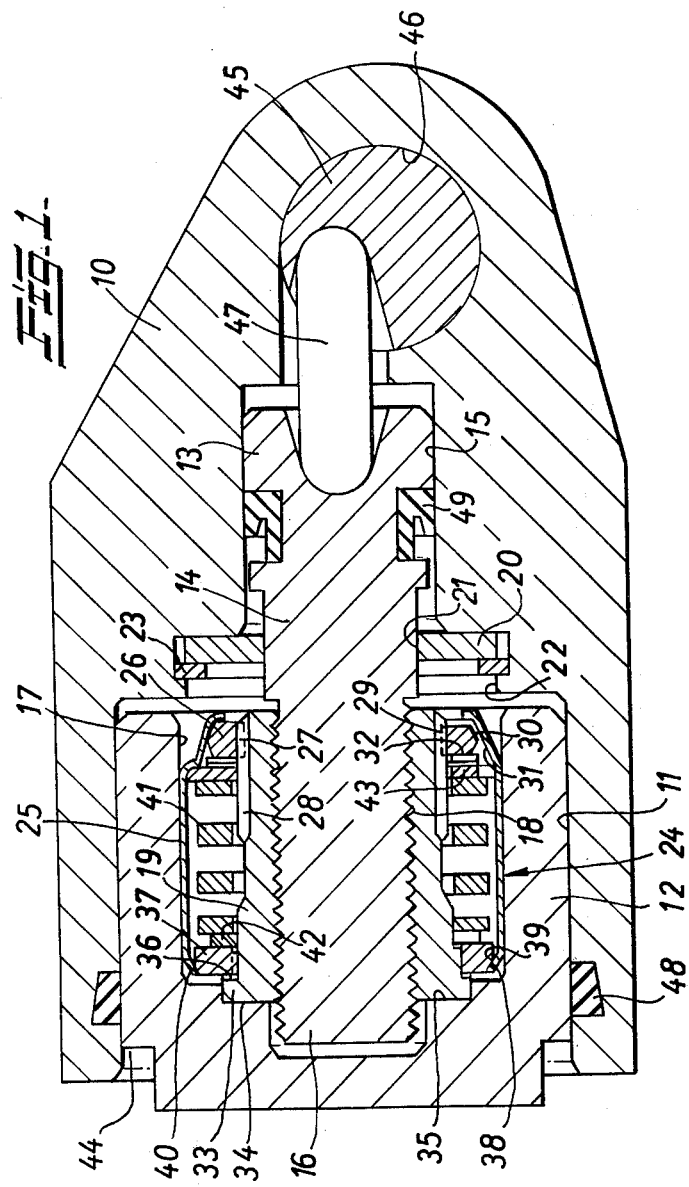

United States Patent [19]
Farr

[11] 3,878,923
[45] Apr. 22, 1975

[54] BRAKE ADJUSTERS

[75] Inventor: Glyn Phillip Reginald Farr, Leek Wootton, England

[73] Assignee: Girling Limited, Warwickshire, England

[22] Filed: Jan. 21, 1974

[21] Appl. No.: 434,897

[30] Foreign Application Priority Data
Jan. 17, 1973 United Kingdom.............. 4278/73

[52] U.S. Cl............................. 188/196 D; 188/71.9
[51] Int. Cl............................................. F16d 65/56
[58] Field of Search........... 188/71.9, 106 F, 196 D, 188/196 BA

[56] References Cited
UNITED STATES PATENTS

| | | | |
|---|---|---|---|
| 3,244,260 | 4/1966 | Frayer............................ | 188/196 D |
| 3,550,732 | 12/1970 | Beller............................ | 188/196 D |
| 3,732,952 | 5/1973 | Asquith............................ | 188/71.9 |

Primary Examiner—Duane A. Reger
Attorney, Agent, or Firm—Scrivener Parker Scrivener and Clarke

[57] ABSTRACT

A slack adjuster for a brake system and comprising first and second members in screw-threaded engagement with one another is provided with a friction ring which is isolated from knock back forces and which is splined to or otherwise relatively non-rotatably but axially displaceably mounted on the second member. The friction ring is spring biased against a friction surface when the brake is released to prevent rotation of the friction ring which itself prevents rotation of the second member.

In one embodiment, the screw-thread connection is non-reversible and a separate reversible screw-thread connection is provided for effecting automatic adjustment. In another embodiment, the screw-thread connection between the first and second members is reversible for effecting automatic adjustment.

12 Claims, 2 Drawing Figures

BRAKE ADJUSTERS

The present invention relates to brake slack adjusters of the kind comprising a screw-thread connection between a first non-rotatable and a second rotatable member.

In British Pat. No. 1,299,376 and the corresponding U.S. Pat. No. 3,680,664 there is described a slack adjuster for a brake system comprising a first non-rotatable member, a second rotatable member and a third non-rotatable member having a common thrust axis; a non-reversible screw-thread connection between said first and second members, said second member being axially displaceable and rotatable relative to said third member and said second member having an abutment surface mating with a complementary non-rotatable abutment surface; a fourth rotatable member coaxial with said thrust axis; a reversible screw-thread connection between said fourth member and one of said second and third members; cooperating friction clutch surfaces between said fourth member and the other of said second and third members; and resilient means biassing said fourth member in a direction to urge said friction clutch surfaces towards one another to urge said fourth member into a resting position relative to said one member when said abutment surfaces are in interengagement; the arrangement being such that, when slack is taken up by actuation of the brake system and when (but only when) the slack exceeds a predetermined value, an axially directed force is developed at said reversible screw-thread connection to rotate the second member and thereby increase the overall length of said adjuster to reduce said slack to said predetermined value.

A reversible screw-thread connection between two members is a connection such that axial displacement of one member causes rotation of the other member and vice versa whereas a non-reversible screw-thread connection between two members is one in which an axial force applied to one member cannot normally cause relative rotation between the members. Whether a screw-thread connection is reversible or not depends upon the pitch and flank angles of the thread and the coefficient of friction between the members.

Thus, upon the presence of excessive brake slack, said resilient means biasses said friction faces to prevent said fourth member from rotating and the axial travel between said first and third members upon actuation of the brake system causes said reversible screw-thread connection to turn said second member to screw said non-reversible screw-thread connection in a direction to reduce the brake slack.

During so-called "knockback" blows are applied to the second member and these blows can tend to turn the second member relative to the first member resulting in excess pedal travel the next time the brake is applied. Knockback can, for example, be caused in the case of a disc brake by disc deflection, for example, on cornering.

This problem arises not only in the above-mentioned automatic adjuster, but also with similar adjusters wherein means other than a reversible screw-thread connection are provided for turning the second member relative to the first member. Furthermore, the problem also arises with an adjuster wherein a reversible screw-thread connection is provided between the first and second members.

According to the present invention, an automatic brake adjuster comprising a screw-thread connection between a first non-rotatable member and a second rotatable member having a common thrust axis is provided with means to inhibit rotation of said second member in the resting position of the adjuster, said second member being axially movable relative to said means, and said means being isolated from knockback forces.

Preferably said means comprises a friction member which is rotatably coupled to said second member whilst permitting axial movement of said second member, said friction member having a friction surface urged by spring means against a complementary non-rotatable friction surface when the adjuster is in its resting position.

Figure 2:
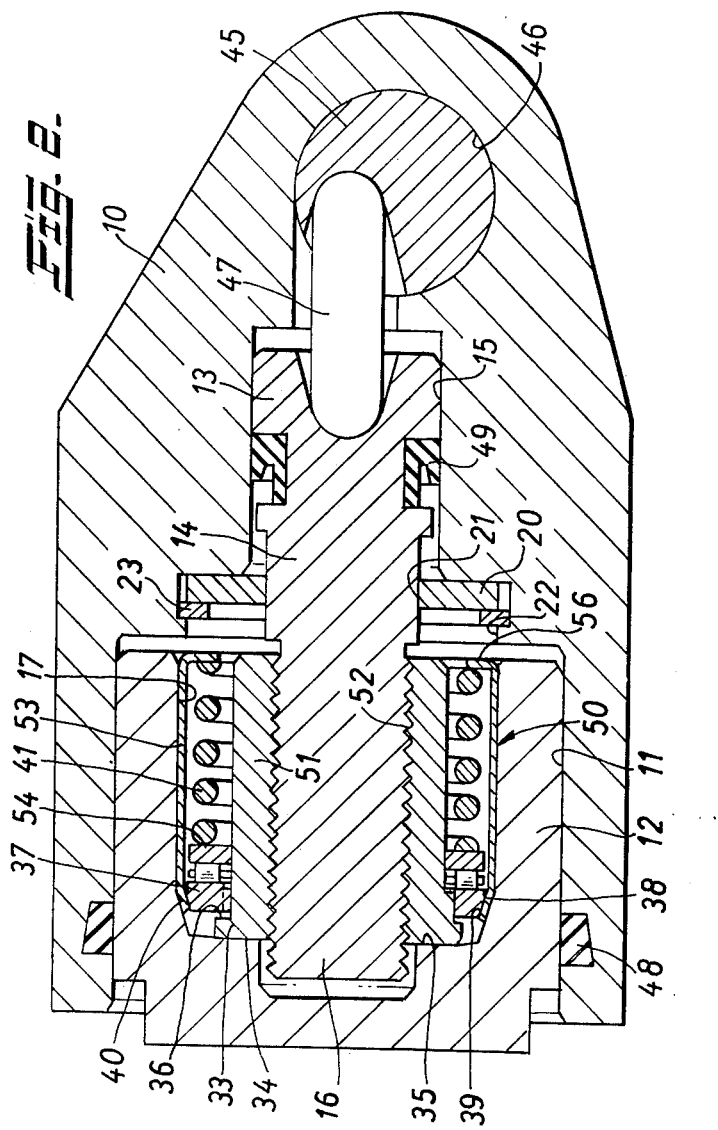

The invention is further described, by way of example, with reference to the accompanying drawings, in which:

FIGS. 1 and 2 are diagrammatic sectional elevations of two embodiments of automatic brake adjusters constructed in accordance with the present invention.

Referring firstly to FIG. 1, a brake cylinder body 10 of a hydraulic brake system for a vehicle has a cylinder bore 11 in which a brake actuating piston 12 is slidable. One end 13 of a spindle 14 is slidably received in a reduced diameter bore 15 in the cylinder body 10 coaxial with the cylinder bore 11. The other end 16 of the spindle 14 extends into a blind bore 17 in the piston 12. The end 16 of the spindle 14 has a non-reversible righthand screw-thread connection 18 with a rotatable nut 19 housed within the blind bore 17. The central portion of the spindle 14 extends through an aperture 21 in a key plate 20 which is held in an intermediate bore portion 22 of the cylinder body 10 by means of a spring ring 23. An axially directed peg (not shown) extending between the cylinder body 10 and the key plate 20 prevents the key plate from turning and the aperture 21 in the key plate is non-circular, the central portion of the spindle 14 having a complementary non-circular cross-section so that the spindle 14 is prevented from turning relative to the key plate, but is free to slide axially relatively thereto. The spindle 14 is thereby rendered non-rotatable.

The nut 19 forms part of an automatic adjuster mechanism 24 which, apart from certain modifications, is substantially the same as one of the adjuster mechanisms described in our earlier U.S. Pat. application Ser. No. 278,355. The adjuster mechanism 24 includes an encapsulating container 25 and an annulus 26. The annulus 26 is disposed within the container 25 and surrounds the nut 19. The annulus 26 has a multi-start internal screw-thread 27 mating with a multi-start external screw-thread 28 on the nut 19 to form a reversible screw-thread connection 29. The reversible screw-thread connection 29 is of opposite hand to the non-reversible screw-thread connection 18.

The annulus 26 has an external conical friction clutch surface 30 which cooperates with an internal annular friction clutch surface 31 inside the encapsulating container 25. Resilient means in the form of a wavy washer spring 32 act on the annulus 26 in a direction to axially bias the friction clutch surfaces 30 and 31 into frictional engagement with one another.

The nut 19 has a flanged end 33 normally in engagement by an abutment surface 34 with a complementary surface 35 at the blind end of the bore 17 in the piston 12. The flanged end 33 has an additional rear abutment surface 36 which cooperates with a friction ring 37 encircling the nut 19. The friction ring 37 is splined to the nut 19 but is axially displaceable relatively thereto. A conical friction surface 38 on the friction ring 37 cooperates with a complementary friction surface 39 formed by a peened-over edge 40 of the encapsulating container 25. An additional spring 41 acts via an antifriction washer 42 on the friction ring 37 in a direction to bring the friction surfaces 38 and 39 into engagement with one another. The spring 41 is supported by a washer 43 which bears against an additional abutment surface formed by a stop inside the encapsulating container 25. The spring 32 acting on the annulus 26 is disposed between this annulus and the washer 43.

Normal manufacturing tolerances are provided at the non-reversible screw-thread connection 18, but substantial axial clearance is provided at the reversible screw-thread connection 29 in order to accommodate the normal axial travel of the piston 12 relative to the cylinder body 10.

The piston 12 acts against a brake pad or shoe (not shown) and the brake is applied by applying fluid pressure (for example, by means of a brake pedal and master cylinder) to the inner end of the cylinder bore 11 through an inlet (not shown). If desired, a brake return spring (not shown) can act against an outer shoulder 44 on the piston 12. Means (not shown) are provided for preventing the piston 12 from turning relative to the cylinder body 10.

An auxiliary brake applying mechanism (for example, for a handbrake) comprises a cam 45 rotatably received in a transverse bore 46 in the cylinder body 10. The cam 45 acts via a dolly 47 on the end 13 of the spindle 14.

A seal 48 seals the piston 12 to the bore 11 and a seal 49 seals the spindle end 13 to the bore 15.

The brake cylinder is shown in FIG. 1 in its normal resting position in which the abutment surface 35 inside the piston 12 rests against the abutment surface 34 on the nut 19, which in turn rests via the non-reversible screw-thread connection 18, the spindle 14 and the dolly 47 against the cam 45. The cam 45 itself rests against a stop (not shown) when in its resting position. In this normal resting position a small clearance of, for example, about one thousandth of an inch exists between the abutment surface 36 on the rear face of the flanged end 33 of the nut 19 and the friction ring 37. During normal operating of the brake the piston 12 is moved to the left by the fluid pressure relative to the cylinder body 10. Almost immediately the spindle 14 is likewise moved to the left, the axial clearance between the abutment surface 36 and the friction ring 37 being immediately taken up. However, the fluid pressure acts to the right on the spindle 14 and when the fluid pressure reaches a predetermined value the force of the spring 41 is overcome, this hydraulic pressure being lower compared with the normal braking pressures to be expected. The spindle 14 is moved to the right against the cam 45. The friction surfaces 38 and 39 are parted but the axial clearance at the reversible screw-thread connection 29 is not fully taken up so long as brake lining wear requiring consequential brake adjustment has not taken place.

As soon as the brake lining wear results in relative axial travel between the piston 12 and the spindle 14, sufficient to take up the axial clearance at the reversible screw-thread connection 29 during hydraulic application of the brake, the reversible screw-thread connection causes the nut 19 to be turned on the spindle 14, the annulus 26 being prevented from turning because of the friction developed between the friction clutch surfaces 30 and 31 under the force of the spring 32. When the brake pressure is released the nut 19 is moved to the left relative to the piston 12 and to the encapsulating container 25 force-fitted in the bore 17, and the axial clearance at the reversible screw-thread connection 29 is taken up before the brake cylinder is returned to its resting position, thereby applying a leftward force on the annulus 26 tending to part the friction clutch surfaces 30 and 31 and thereby reducing the friction forces resisting rotation of the annulus 26. The friction at the non-reversible screw-thread connection 18 tending to prevent rotation of the nut 19 now predominates so that the annulus 26 is turned to permit the friction ring 37 to return to its resting position and the nut 19 to return to its resting position against the piston 12.

During operation of the vehicle to which the brake is fitted, so-called knockback may take place. In the case of a disc brake such knockback can be caused by disc deflection, for example, on cornering. Such knockback comprises blows applied to the piston 12 in a rightward direction and these blows are transmitted to the nut 19. Such blows would tend to cause the nut 19 to turn back on the spindle 14 but for the presence of the friction ring 37 which is splined to the nut 19, and which is prevented from turning by the friction developed at the friction surfaces 38 and 39, under the force of the spring 41. The small axial clearance between the rear abutment surface 36 and the friction ring 37 prevents the blows due to knockback from being transmitted to the friction ring 37. If they were so transmitted they would tend to separate the friction surfaces 38 and 39 so that the ring 37 could no longer resist rotation.

For handbrake operation the cam 45 is turned anticlockwise thereby acting to the left on the piston 12 via the dolly 47, the spindle 14 and the nut 19. It will be noted that the handbrake force is not transmitted through any part of the automatic adjuster 24 other than the nut 19.

FIG. 2 of the drawings shows another embodiment of the invention in which parts like those of FIG. 1 are denoted by like reference numerals and will not be described again. The embodiment of FIG. 2 differs from that of FIG. 1 in that it is provided with an automatic adjuster mechanism 50 whose nut 51 has a reversible screw-thread connection 52 with the lefthand end 16 of the spindle 14. The automatic adjuster 50 comprises in addition to the nut 51 a friction ring 37 having the external conical friction surface 38 cooperating with the internal conical friction surface 39 formed by the peened-over end 40 of an encapsulating container 53 which is force-fitted in the blind bore 17 of the piston 12. The friction surfaces 38 and 39 are brought into interengagement with one another by the spring 41 which in this embodiment acts between a thrust race 54 of a roller thrust bearing 55 and an inturned flange 56 on the encapsulating container 53. The friction ring 37 forms the other thrust race of the thrust bearing which serves to minimise rotational friction between the friction ring 37 and the spring 41.

As in the preceding embodiment the nut 51 has a flanged end in abutment surface 34 with the abutment surface 35 inside the piston 12. There is a small axial clearance between the rear abutment surface 36 and the flanged end 33 of the spindle 14, and the friction ring 37 which encircles and is splined to the nut 51.

In operation the normal axial travel between the piston 12 and the cylinder body 10 is accommodated by axial clearance at the reversible screw-thread connection 52 or between the flanged end 33 and the friction ring 37. When brake lining wear results in a greater axial travel between the piston 12 and the cylinder body 10 than can be accommodated by the clearance at the reversible screw-thread connection during brake operation, the nut 51 is urged to the right relative to the piston 12 to separate the abutment surfaces 34 and 35 and almost immediately thereafter to bring the abutment surface 36 against the friction ring 37. As a result the nut 51 takes up the force of the spring 41, thus tending to part the friction surfaces 38 and 39 and reduce the frictional torque preventing rotation of the friction ring 37. The reversible screw-thread connection 52 thereby causes the nut 51 to turn on the spindle 14 together with the friction ring 37. Upon brake release the nut 51 is prevented from turning back by the friction developed at the friction surfaces 38 and 39 subject to the force of the spring 41.

As in the preceding embodiment during knockback the nut 51 is prevented from being turned under the influence of the knockback blows by the friction ring 37 which is isolated from the knockback blows by the axial clearance from the abutment surface 36.

During handbrake application the cam 45 is turned anticlockwise and acts via the dolly 47, the spindle 14, the nut 51 and the piston 12. The nut 51 is now prevented from turning back on the spindle 14, not only by the friction ring 37 but also by the friction developed between the friction surfaces 34 and 35 which are now subject to the handbrake load. As in the preceding embodiment no part of the automatic adjuster 50 is subjected to the handbrake load other than the nut 51.

I claim:

1. An automatic brake slack adjuster comprising a first non-rotatable member; a second rotatable member having a common thrust axis; a screw-thread connection between said first and second members; and means to inhibit rotation of said second member in the resting position of the adjuster, said rotation inhibiting means comprising a friction member and means rotatably coupling said friction member to said second member, said second member being axially movable relative to said friction member and said friction member having a friction surface, means defining a complementary non-rotatable friction surface and spring means urging said friction surfaces against one another when the adjuster is in its resting position.

2. An automatic adjuster according to claim 1 in which the permitted axial movement of said second member relative to said friction member is predetermined relative to the desired brake slack, whereby axial movement of said second member relative to said non-rotatable friction surface upon brake application brings the second member into abutment with said friction member to part said friction surfaces at least when the brake slack exceeds the desired brake slack.

3. An automatic adjuster according to claim 1 in which said friction surfaces are conical.

4. An automatic adjuster according to claim 1 in which said first member comprises a screw, said second member comprises a nut and said friction member comprises a ring encircling said nut.

5. An automatic adjuster according to claim 1 in which said screw-thread connection is non-reversible and means are provided for turning said second member responsively to a requirement for adjustment.

6. An automatic adjuster according to claim 5 in which the last-mentioned means comprise a third non-rotatable member having a common thrust axis with the first and second members; said second member being axially displaceable and rotatable relative to said third member and said second member having an abutment surface mating with a complementary non-rotatable abutment surface; a fourth rotatable member coaxial with said thrust axis; a reversible screw-thread connection between said fourth member and one of said second and third members; cooperating friction clutch surfaces between said fourth member and the other of said second and third members; and resilient means biassing said fourth member in a direction to urge said clutch surfaces towards one another to urge said fourth member into a resting position relative to said one member.

7. An automatic adjuster according to claim 6 in which said fourth member comprises an annulus encircling said second member.

8. An automatic adjuster according to claim 7 in which said reversible screw-thread connection comprises an external thread on said second member and an internal thread on said annulus and said clutch surfaces comprise an external annular surface on said annulus and an internal annular surface in said third member.

9. An automatic adjuster according to claim 6 in which said third member comprises an encapsulating container in which said fourth member, said resilient means and said second member are at least partly disposed.

10. An automatic adjuster according to claim 9 in which said friction member comprises a friction ring encircling said second member and in which said friction ring and said spring means are also disposed in said container, said non-rotatable friction surface comprising an annular surface inside said container.

11. An automatic adjuster according to claim 1 in which said screw-thread connection is reversible whereby to produce rotation of said second member responsively to a requirement for adjustment.

12. An automatic adjuster according to claim 1 which is associated with a hydraulic actuator and in which an auxiliary mechanical actuator is provided and acts through said adjuster.

* * * * *